Patented June 24, 1947

2,423,007

UNITED STATES PATENT OFFICE 2,423,007

DI(ARYL SULFENE) AMIDES AS CO-ACCELERATORS

Ralph A. Coleman, Naugatuck, Conn., assignor to United States Rubber Company, New York, N. Y., a corporation of New Jersey No Drawing. Application September 7, 1945, Serial No. 615,073

5 Claims. (Cl. 260—795)

This invention relates to the vulcanization of rubber and similar sulfur-vulcanizable rubber-like materials, by an improved process employing a new accelerator mix.

This invention is concerned with the use of di(arylsulfene) amides as co-accelerators for nitrogen-containing accelerators of vulcanization. The co-accelerators subscribe to the general formula

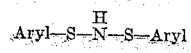

where each aryl represents an aromatic nucleus of the benzene, naphthalene, or biphenyl series. Said nuclei may be further substituted by such groups as methyl, ethyl, methoxy, ethoxy, phenoxy, nitro, chloro, acetyl, benzoyl, carboxyl, sulfonamide, carbethoxy, cyano, etc.

Exemplary of the preferred di(arylsulfene) amides are:

Di(benzenesulfene) amide
Di(p-toluenesulfene) amide
Di(o-nitrobenzenesulfene) amide
Di(p-nitrobenzenesulfene) amide
Di(m-nitrobenzenesulfene) amide
Di(2,5-dichlorobenzenesulfene) amide
Di(p-chlorobenzenesulfene) amide
Di(o-carboxybenzenesulfene) amide
Di(p-carbethoxybenzenesulfene) amide
Di(1-nitronaphthalene-2-sulfene) amide
Di(2-nitronaphthalene-1-sulfene) amide
Di(1,4-dichloronaphthalene-2-sulfene) amide Among the useful nitrogen-containing primary accelerators employable with any of the above di(arylsulfene) amides are the following:

Acetaldehyde-aniline products
Acetaldehyde-butyraldehyde-aniline product
Acetaldehyde-formaldehyde-aniline product
Acetaldehyde-p-toluidine-aniline product
Alpha-ethyl beta-propyl acrolein-aniline product
Tributylidene aniline
Butyraldehyde-monobutylamine product
Formaldehyde-aniline product
Formaldehyde-monoethyl amine product
Formaldehyde-p-toluidine product
Diphenyl guanidine
Di-o-tolyl guanidine
Triphenyl guanidine
2-mercaptothiazole
4,5-dimethyl 2-mercapto thiazole
4-ethyl 2-mercaptothiazole
2-mercaptobenzothiazole
Zinc 2-benzothiazole sulfide
Dinitrophenyl 2-benzothiazyl sulfide
Phenyl amino methyl 2-benzothiazyl sulfide Bis-N,N'-(2-benzothiazyl thiomethyl) urea
Benzoyl 2-benzothiazyl sulfide
Benzothiazyl 2-monocyclohexyl sulfenamide
2-mercaptothiazoline
Tetramethyl thiuram monosulfide
2-mercapto-4-methylthiazoline
Tetramethyl thiuram disulfide
Zinc dimethyl dithiocarbamate
Tetraethyl thiuram disulfide
Lead dimethyl dithiocarbamate The use of these materials as co-accelerators for the primary vulcanization accelerators allows greater freedom of compounding variation. By varying the ratios of accelerator and co-accelerator it is possible to obtain a series of combinations varying in scorch and curing properties. The di(arylsulfene) amides of this invention have no substantial accelerating ability per se. The ratio of activator to accelerator is to be chosen depending on the type of rubber (natural or synthetic) type of stock (white stock, etc.), temperature of cure, time of cure, the particular primary accelerator, for example in the case of mercapto benzothiazole the proportion of co-accelerator generally ranges from 25 to 200 percent by weight, based on the weight of the mercapto benzothiazole and lastly, the objectives of the compounder, i. e., whether he desires to provide a low or high modulus stock, to provide for a short or a long cure.

For the tests given below, the di(arylsulfene) amide may be prepared by the action of aqueous ammonia on the aryl sulfur chloride according to the equation:

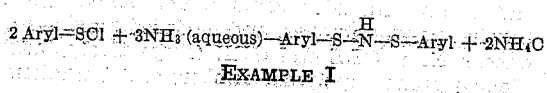

EXAMPLE I

Preparation of di(o-nitrobenzenesulfene) amide according to the procedure of Zincke and Farr, Ann. 391, 57 (1921):

o-Nitrobenzenesulfenyl chloride is shaken with a 10% aqueous ammonia solution. The di(sulfene) amide is then separated by extracting into ether which is subsequently removed by evaporation. The di(o-nitrobenzenesulfene) amide residue is recrystallized from acetic acid. Its melting point is at 217° C. with decomposition.

Other di(arylsulfene) amides are described in the literature, as follows: Di(benzenesulfene)- amide and di(toluenesulfene) amide by Lecher et al., Ber. 58 B 409 (1925); di(p-nitrobenzenesulfene) amide by Zincke and Lenhardt, Ann. 400, 1 (1913); di(o-nitro-p-toluenesulfene) amide by Zincke and Rose, Ann. 406, 103 (1914); di(p- chloro-o-nitrobenzenesulfene) amide by Zincke and Baeumer, Ann. 416, 86 (1918); and di(alpha chloronaphthalene-beta-sulfene) amide by Zincke and Eisenmayer, Ber. 51, 751 (1918).

The following data illustrates the use of a di-(arylsulfene) amide as a co-accelerator in rubber, the parts being by weight:

EXAMPLE II

| Master Batch | Parts |
|---|---|
| Smoked sheet | 100 |
| Carbon black | 45 |
| Zinc soap of coconut oil fatty acids | 3.5 |
| Pine tar | 3.5 |
| Zinc oxide | 5.0 |
| Sulfur | 3.0 |
| | 160.0 |

| | Stock A | Stock B |
|---|---|---|
| Above Master Batch | 160.0 | 160.0 |
| Mercapto benzothiazole | 1.0 | .5 |
| Di(p-chloro-o-nitrobenzenesulfene)amide | | .8 |

The compounded rubber was cured at 30 pounds per square inch of steam for 30, 45, and 60 minutes.

*Tensile data*

| | Stock A | | Stock B | |
|---|---|---|---|---|
| | T | E | T | E |
| Cure: | | | | |
| 30'/30#— | | | | |
| 300% | 510 | | 600 | |
| 500% | 2,010 | | 1,800 | |
| Break | 2,850 | 625 | 2,730 | 640 |
| 45'/30#— | | | | |
| 300% | 900 | | 920 | |
| 500% | 2,520 | | 2,400 | |
| Break | 3,200 | 600 | 3,320 | 630 |
| 60'/30#— | | | | |
| 300% | 1,030 | | 920 | |
| 500% | 2,680 | | 2,490 | |
| Break | 3,020 | 556 | 3,100 | 600 |
| T-50 at 350% Elongation: | | | | |
| 45'/30# | | −6.6 | | −5.8 |
| 60'/30# | | −15.0 | | −14.2 |
| 75'/30# | | −19.4 | | −20.4 |

T represents tensile strength in pounds per square inch.
E represents percent elongation.

It is to be understood that the term "a rubber" is employed in the claims in a generic sense to refer to natural as well as synthetic rubbers which are capable of vulcanization when heated with sulfur, and includes caoutchouc, balata, gutta percha, polybutadienes, and modified polybutadienes, such as GRS and GRN (respectively, butadiene-styrene copolymer rubber, and butadiene-acrylonitrile copolymer rubber), as well as latices and reclaims of such materials, whether or not admixed with pigments, fillers, softeners, antioxidants, etc.

Other ratios of the compounding ingredients than those mentioned in the examples given, as well as other well-known fillers, pigments, etc., may be employed in the production of various types of rubber compounds, and are apparent to those skilled in the art to which the invention pertains.

Having thus described my invention, what I claim and desire to protect by Letters Patent is:

1. A method of vulcanizing a rubber which comprises incorporating therein sulfur, a primary organic nitrogen-containing rubber-vulcanization accelerator, and a compound having the general formula

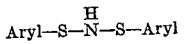

where aryl represents an aromatic nucleus of the group consisting of the benzene, naphthalene, and biphenyl series.

2. A rubber composition containing a primary organic nitrogen-containing rubber-vulcanization accelerator, and a compound having the general formula

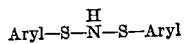

where aryl represents an aromatic nucleus of the group consisting of the benzene, naphthalene, and biphenyl series.

3. A method of vulcanizing a rubber which comprises incorporating therein sulfur, a primary organic nitrogen-containing rubber-vulcanization accelerator, and di(p-chloro-o-nitrobenzenesulfene) amide.

4. A method of vulcanizing a rubber which comprises incorporating therein sulfur, a primary organic nitrogen-containing rubber-vulcanization accelerator, and di(benzenesulfene) amide.

5. A method of vulcanizing a rubber which comprises incorporating therein sulfur, a primary organic nitrogen-containing rubber-vulcanization accelerator, and di(p-nitrobenzenesulfene)-amide.

RALPH A. COLEMAN.

REFERENCES CITED

The following references are of record in the file of this patent:

UNITED STATES PATENTS

| Number | Name | Date |
|---|---|---|
| 1,949,629 | Romieux et al. | Mar. 6, 1934 |